United States Patent
Nguyen et al.

(10) Patent No.: US 11,936,185 B1
(45) Date of Patent: Mar. 19, 2024

(54) ENERGY STORAGE-BASED PACKETIZED DELIVERY OF ELECTRICITY

(71) Applicant: National Technology & Engineering Solutions of Sandia, LLC, Albuquerque, NM (US)

(72) Inventors: Tu Anh Nguyen, Albuquerque, NM (US); Raymond H. Byrne, Albuquerque, NM (US); Babu Chalamala, Albuquerque, NM (US); David G. Wilson, Tijeras, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/901,497

(22) Filed: Sep. 1, 2022

Related U.S. Application Data

(60) Provisional application No. 63/239,489, filed on Sep. 1, 2021.

(51) Int. Cl.
*H02J 3/00* (2006.01)
*H02J 3/32* (2006.01)
*H02J 3/38* (2006.01)

(52) U.S. Cl.
CPC .............. *H02J 3/0075* (2020.01); *H02J 3/32* (2013.01); *H02J 3/381* (2013.01); *H02J 2300/24* (2020.01)

(58) Field of Classification Search
CPC .. H02J 3/0075; H02J 3/32; H02J 3/381; H02J 3/832; H02J 3/383; H02J 2300/24
USPC ............................................................. 307/25
See application file for complete search history.

(56) References Cited

U.S. PATENT DOCUMENTS

2015/0142198 A1* 5/2015 Grebel .................... H02J 3/007
700/295

OTHER PUBLICATIONS

Abe, R. et al., "Digital Grid: Communicative Electrical Grids of the Future," IEEE Transactions on Smart Grid (2011) 2(2):399-410.
Gao, M. et al., "Probabilistic Model Checking and Scheduling Implementation of an Energy Router System in Energy Internet for Green Cities," IEEE Transactions on Industrial Informatics (2018) 14(4):1501-1510.
Huang, A. Q. et al., "THe Future Renewable Electric Energy Delivery and Management (FREEDM) System: The Energy Internet," Proceedings of the IEEE (2011) 99(1):133-148.

(Continued)

Primary Examiner — Hal Kaplan
(74) Attorney, Agent, or Firm — Daniel J. Jenkins

(57) ABSTRACT

Systems and methods for Energy Storage-based Packetized Delivery of Electricity (ES-PDE) are disclosed that are radically different from the operation of today's grid. Using ES-PDE, the loads are powered by the energy storage systems (ESS) the majority of the time and only receive packets of electricity periodically to charge the ESSs. Therefore, the grid operators can schedule the delivery of electricity packets to utilize the existing grid infrastructure. Since the customers are powered by the co-located ESSs they are not impacted by the grid operation in short term. Therefore, when grid outages occur, the customers still have power for some time, giving the grid more time to be fully restored.

10 Claims, 5 Drawing Sheets

(56) References Cited

OTHER PUBLICATIONS

Kim, Y.-J. et al., "Analysis and Experimental Implementation of Grid Frequency Regulation Using Behind-the-Meter Batteries Compensating for Fast Load Demand Variations," IEEE Transactions on Power Systems (2017) 32(1):484-498.

Ma, J. et al., "Elastic Energy Distribution of Local Area Packetized Power Networks to Mitigate Distribution Level Load Fluctuation," IEEE Access (2018) 6:8219-8231.

Nagarajan, A. et al., "Design and Strategy for the Deployment of Energy Storage Systems in a Distribution Feeder with Penetration of Renewable Resources," IEEE Transactions on Sustainable Energy (2015) 6(3):1085-1092.

Nardelli, P. H. J. et al., "Energy Internet via Packetized Management: Enabling Technologies and Deployment Challenges," IEEE Access (2019) 7:16909-16924.

Nguyen, T. A. et al., "Utilization of Existing Generation Fleets Using Large-scale Energy Storage Systems," Proceedings of the 2020 IEEE Power Energy Society General Meeting, Montreal, Canada, Aug. 2020, SAND2019-13797C, 5 pages.

Vedullapalli, D. T. et al., "Combined HVAC and Battery Scheduling for Demand Response in a Building," IEEE Transactions on Industry Applications (2019) 55(6):7008-7014.

Wang, K. et al., "A Survey on Energy Internet: Architecture, Approach, and Emerging Technologies," IEEE Systems Journal (2018) 12(3):2403-2416.

\* cited by examiner

ENERGY STORAGE-BASED PACKETIZED DELIVERY OF ELECTRICITY

CROSS-REFERENCE TO RELATED APPLICATION

This application claims the benefit of U.S. Provisional Application No. 63/239,489, filed Sep. 1, 2021, entitled "Energy Storage-based Packetized Delivery of Electricity," which is incorporated herein by reference in its entirety.

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to electrical grid operations, and more particularly directed to using packetized energy to charge grid storage systems.

BACKGROUND OF THE INVENTION

In today's power grid, electricity demand must be matched instantaneously by electricity generation due to the lack of energy storage capacity. To ensure grid reliability, the generation, transmission and distribution systems must have sufficient capacity to meet the peak demand. In the future, as the number of electric vehicles (EV) increases, the peak demand is anticipated to increase sharply since EV charging tends to coincidentally occur in the evening when drivers arrive home from work. That will require tremendous investment to upgrade grid infrastructure just to meet the peak demand. Furthermore, as more and more renewable energy (RE) resources are integrated into the grid to achieve decarbonization goals, the variability and uncertainty from those resources will create many technical challenges in maintaining grid reliability and stability. Therefore, to help mitigate these problems, the peak demand, the variability and uncertainty from RE must be effectively managed.

Among the recent technologies, energy storage has shown to be one of the most effective solutions for the above problems as it can provide the needed flexibility to both the grid operators and the customers. In the literature, many studies have investigated the use of energy storage systems (ESS) for different applications and services. These studies often access the technical and economic benefits of ESSs for multiple services in electricity markets, for Transmission and Distribution (T&D) upgrade deferral and congestion relief and for behind-the-customer-meter applications. Many papers also study the optimal control of ESSs for the above applications. An optimal control for frequency regulation using behind-the-meter battery energy storage systems (BESS) have been discussed in Y. Kim, G. Del-Rosario-Calaf, and L. K. Norford, "Analysis and experimental implementation of grid frequency regulation using behind-the-meter batteries compensating for fast load demand variations," IEEE Transactions on Power Systems, vol. 32, no. 1, pp. 484-498, January 2017.

Model predictive control (MPC) for the management of building demand with BESS and heating ventilation air conditioning (HVAC) is used in D. T. Vedullapalli, R. Hadidi, and B. Schroeder, "Combined hvac and battery scheduling for demand response in a building," IEEE Transactions on Industry Applications, vol. 55, no. 6, pp. 7008-7014, November 2019. An optimal BESS control is proposed in A. Nagarajan and R. Ayyanar, "Design and strategy for the deployment of energy storage systems in a distribution feeder with penetration of renewable resources," IEEE Transactions on Sustainable Energy, vol. 6, no. 3, pp. 1085-1092, July 2015, for mitigating solar PV variability while reducing transformer losses. An optimization framework has been proposed in T. Nguyen, R. Byrne, and R. D. Trevizan, "Utilization of existing generation fleets using large-scale energy storage systems," in Proceedings of the 2020 IEEE Power Energy Society General Meeting, Montreal, Canada, August 2020, pp. 1-5, to maximize the benefit of ESSs for utilizing the existing fossil-fueled generation fleet.

Beside energy storage, many other technologies and solutions are also developed to help manage the highly decentralized, distributed and transactive grid in the future, among which Packetized Energy (or Energy-as-packet, Energy Internet) introduces a completely different way in balancing electricity supply and demand [R. Abe, H. Taoka, and D. McQuilkin, "Digital grid: Communicative electrical grids of the future," IEEE Transactions on Smart Grid, vol. 2, no. 2, pp. 399-410, 2011]. In a packetized-energy system, energy is delivered to consumers as packets during certain times [K. Wang, J. Yu, Y. Yu, Y. Qian, D. Zeng, S. Guo, Y. Xiang, and J. Wu, "A survey on energy internet: Architecture, approach, and emerging technologies," IEEE Systems Journal, vol. 12, no. 3, pp. 2403-2416, 2018] [P. H. J. Nardelli, H. Alves, A. Pinomaa, S. Wahid, M. D. C. Tom'e, A. Kosonen, F. Kuhnlenz, A. Pouttu, and D. Carrillo, "Energy internet] via packetized management: Enabling technologies and deployment challenges," IEEE Access, vol. 7, pp. 16909-16924, 2019.] In the literature, packetized energy has been studied extensively. Most recent studies focus on the energy management and control of the packetized energy systems. For example, [A. Q. Huang, M. L. Crow, G. T. Heydt, J. P. Zheng, and S. J. Dale, "The future renewable electric energy delivery and management (freedm) system: The energy internet," Proceedings of the IEEE, vol. 99, no. 1, pp. 133-148, 2011], presents a plug-and-play energy internet where energy packets are routed using energy routers (similar to internet modems). In [M. Gao, K. Wang, and L. He, "Probabilistic model checking and scheduling implementation of an energy router system in energy internet for green cities," IEEE Transactions on Industrial Informatics, vol. 14, no. 4, pp. 1501-1510, 2018], an energy-router-based architecture is proposed using a continuous-time Markov chain that models and monitors system behaviors.

Nevertheless, most of the published work do not pertain to investigations on the use of energy storage in packetized networks. Only in [J. Ma, N. Zhang, and X. Shen, "Elastic energy distribution of local area packetized power networks to mitigate distribution level load fluctuation," IEEE Access, vol. 6, pp. 8219-8231, 2018] is store-then-consume mechanism for local packetized power networks proposed. While this approach aims to reduce the aggregated load fluctuation in the distribution system, it does not consider distributed RE systems that can be significant in the future grid.

What is needed are grid energy systems that overcome the deficiencies and limitations of the prior art.

SUMMARY OF THE INVENTION

The present disclosure is directed to Energy Storage-based Packetized Delivery of Electricity (ES-PDE) that is radically different from the previous packetized energy frameworks by using distributed ESSs to decouple electricity generation and demand while considering the high penetration of RE in the distribution system. ESSs include, but are not limited to batteries such as electrochemical batteries and electromechanical ESSs such as, but not limited to flywheels, compressed air systems, and gravity storage systems. According to the present disclosure, packetized energy from the Grid is used to charge the ESSs. In this disclosure, the term "Grid" is used to mean the wide area utility electrical grid Packetized energy is a specified energy amount at a specified delivery time or schedule. In one embodiment, one or more loads are powered by one or more energy storage systems (ESS) the majority of the time and the ESSs receive packets of electricity periodically to charge the ESSs. In essence, ES-PDE decouples electricity generation and consumption using distributed energy storage systems, which allows both generation and consumption to follow their own schedules that maximizes ESSs utilization. Using ES-PDE, grid operators can schedule delivery of electricity packets to the customers' ESSs in a manner that fully utilizes the existing grid infrastructure thereby minimizing the system operating cost and neglecting or deferring the need for infrastructure upgrade. The customers are powered by the co-located ESSs and are not impacted by the grid operation in short term. Therefore, when grid outages occur, customers can be self-powered for some period of time by the ESSs, giving the grid more time to be fully restored. This advantage is particularly helpful during natural disasters or physical- and cyber-attacks when the utility grid restoration might be delayed due to some critical damages.

According to an embodiment of the disclosure, a method for delivering energy to a node in a power system is disclosed wherein the node includes one or more energy storage systems and a load. The method includes sizing the energy storage systems, including power and energy ratings, at each node based on expected load and local generation; scheduling delivery of energy packets based on parameters selected from a group comprising grid constraints, generation constraints, energy storage constraints, system operating costs and energy storage degradation; controlling switches that route scheduled energy to at least one energy storage system of the energy storage systems at the correct time to enable packetized delivery of energy; and controlling switches that route unscheduled energy to the one energy storage systems at the correct nodes at the correct time to enable packetized delivery of energy.

According to another embodiment of the disclosure, an energy delivery system, is disclosed that includes one or more energy storage systems and a controller that provides information to a grid operator and receives instructions to provide a packet of energy to one or more of the energy storage systems, the instructions comprising an amount of energy and a delivery schedule for the amount of energy.

An advantage of the present disclosure is lower generation costs as improved plant efficiency will be achieved by operating generation closer to the nominal set points, as well as supporting higher penetrations of low-cost renewable generation.

Another advantage of the present disclosure is better utilization of existing infrastructure as current transmission and distribution systems must be designed to handle the peak load. This means that the majority of the time the infrastructure is underutilized. Because packetized delivery of electricity provides the capability to flatten the load variations, the power system can better utilize existing infrastructure and defer transmission and distribution upgrades.

Another advantage of the present disclosure is simplified planning and power system operations because energy is "ordered" in packets, preferably in advance, much of the second-by-second variation present today can be significantly reduced or eliminated. This pushes the majority of the variability management down to the consumer, and greatly simplifies the operation of the bulk power grid.

Another advantage of the present disclosure is improved resiliency and reliability of the distribution system because each load is off-grid most of the time, when an outage occurs the load can be self-supplied for a long period. Therefore, it gives the grid more time to be fully restored. This advantage is particularly helpful during natural disasters or physical- and cyber-attacks when the utility grid restoration might be delayed due to some critical damages.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The present disclosure is directed to systems and methods that use Packetized Delivery of Electricity (PDE) to charge one or more ESSs in a microgrid or local electric distribution system that is connected to an electric utility grid. The local electric distribution systems include 1) loads, such as but not limited to residential homes, commercial buildings, and industrial facilities powered by energy providers and 2) one or more ESSs, and optionally 3) distributed energy resources (DERs) that generate electricity, such as but not limited to photovoltaic (PV) systems, wind systems and battery energy storage systems (BESS). In some embodiments, the loads are powered by their designated ESSs most of the time and only receive packets of electricity periodically to charge the ESSs. In other embodiments, the loads are alternatively powered by one of the two designated ESSs while packets of electricity are delivered to the other ESS. In any of the above embodiments, the loads may be powered by the Grid at any time.

According to various embodiments of the disclosure, the present disclosure provides electricity packet delivery schemes based on the following principles:

The customers' hourly load profiles are forecasted by the distribution system operators ahead of time (e.g., day ahead).

The operators can then specify the size of each packet and the time to be delivered to a customer's ESSs according to a schedule. For example, at each hour in the next day. The schedule is based on an optimization to minimize an objective function under the system's constraints. For example, the objective function can be minimizing the daily peak of a load or a load aggregation or minimizing electricity bills for the customers. Examples of other objective functions include reducing overall system costs, minimizing transmission losses, and minimizing energy storage cycling.

During each scheduled period (e.g., daily), the difference between the customer's actual and forecasted consumption can be compensated.

Figure 1:
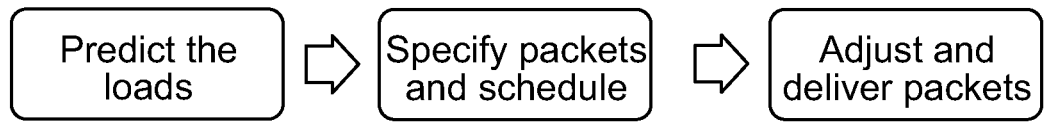
FIG. 1 shows an ES-PDE Workflow according to an embodiment of the disclosure.

The general Energy Storage-based Packetized Delivery of Electricity (ES-PDE) workflow is shown in FIG. 1.

Example. One-ESS Configuration

Figure 2:
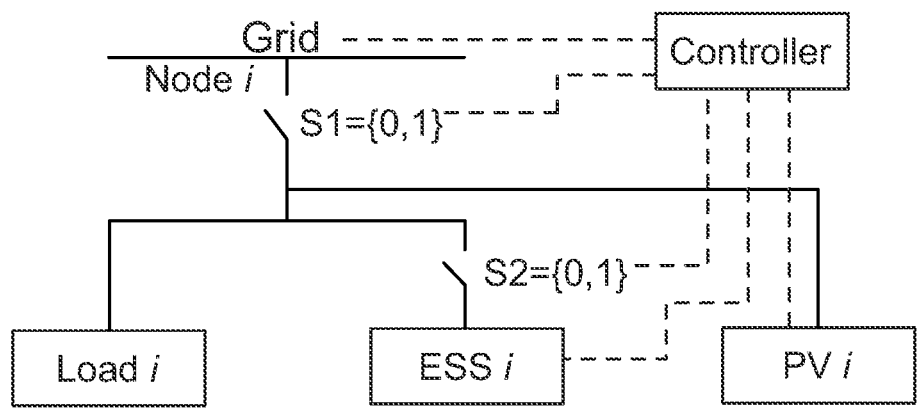
FIG. 2 shows a one-ESS configuration according to an embodiment of the present disclosure.

FIG. 2 illustrates a one-ESS configuration according to an embodiment of the disclosure. Under this configuration, each customer's power system is equipped with one ESS, the ESS with i=1, one or more loads (Load l), and one or more DERs that in this example is one or more photovoltaic systems (PV i). An inverter, which converts DC power supply into AC power for the grid, can be integrated into the ESS if ESS's storage device provides DC output. It should be noted that the load, ESS, and DER may be referred to as a microgrid in contrast to the utility Grid that is the area utility electrical network. For continuous operation of the customer's loads, the power rating of the inverter must be high enough to cover the peak load and power losses. This configuration allows the loads to be powered by ESSs and local PV most of the time and only connect to the grid periodically to charge the ESSs.

The operation modes of the customer's ESS according to this exemplary embodiment are defined as follows:

Grid-connected mode (S1 and S2 are closed): occurs when the ESS via the inverter is connected to the utility Grid to receive energy packets. In this operation mode, the grid energy and on-site distributed energy resource (the PV generation, (optional)) are used to power the load and charge the energy storage devices.

Stand-alone mode (S1 is open and S2 is closed): occurs when the inverter is disconnected to the utility grid. In this operation mode, the customer's loads are powered by the ESS and the on-site distributed generation.

Example. Two-ESS Configuration

Figure 3:
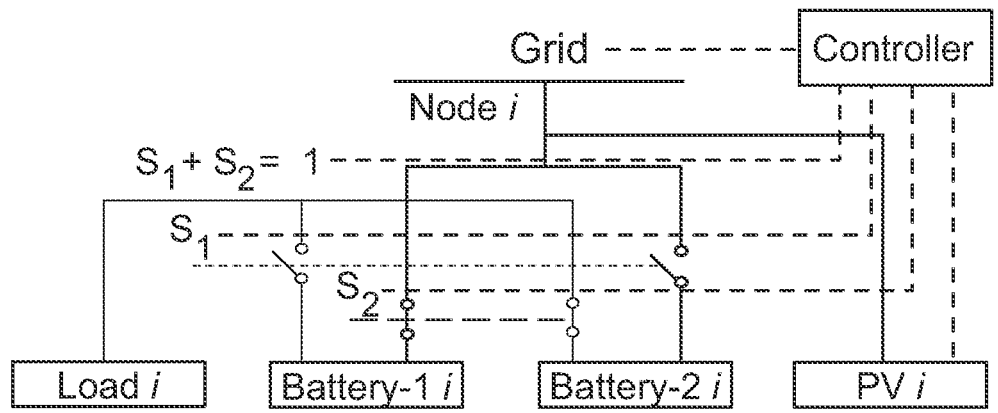
FIG. 3 shows a two-ESS configuration according to an embodiment of the present disclosure.

FIG. 3 illustrates a two-ESS configuration according to an embodiment of the disclosure. Under configuration, each load or load cluster (Load i) is coupled with two ESSs, two batteries (Battery-1i and Battery-2i) in this example, that are alternatively switching between the load and the Grid. At any time, one of the associated ESS discharges to power the load while the other ESS charges to receive the electricity packet from the Grid. The ESSs at different loads and load clusters will be coordinated in a centralized manner by the grid operators to meet specific objectives or requirements. The operation modes of the customer's ESS are defined as follows:

Normal mode (S1, S2 are alternatively open and closed): occurs one of the battery charges from the grid and onsite generation while the other battery discharges to power the load.

Emergency mode (S1 is closed and S2 is closed): occurs when long outages occur on the grid. In this mode, the batteries discharge the entire time to power the load.

This configuration can fully decouple the loads and the grid by using two-storage configuration. Therefore, load variation cannot be seen right away by the grid making the uncertainties be observed before making control actions. Similarly, grid outages cannot be seen right away by the load thereby improving grid resilience significantly.

In both embodiments, the amount of energy of a packet of electricity ranges between zero and the energy rating of ESSs. The size of each packet and the time to be delivered to an ESS are specified to minimize an objective function under the system's constraints. For example, the objective function can be minimizing the daily peak of a load or a load aggregation, minimizing electricity bills for the customers, or maximizing revenue for the load aggregations from participating electricity market.

As can be seen in FIGS. 2 and 3, the systems include a Controller. The Controller communicates with the one or more ESSs to control the switches based on the ESSs' charging and discharging schedule. Specifically, the Controller receives packetized energy delivery schedule from the Grid operator to deliver the energy packets to one or more ESSs while sending commands to switches to connect or disconnect the ESSs accordingly from the Grid. The Controller also communicates with the Grid operator, who may be a utility to inform the Grid operator of all devices' operating states including the ESSs' state of charges so that the Grid operator can perform optimization programs to coordinate multiple loads' systems in an optimal manner. In this exemplary embodiment, the Controller is shown as an independent control unit, however, in other embodiments, the Controller may be integrated into a microgrid controller (not shown), an ESS controller, or other power plant controllers.

Deterministic Delivery Scheduling

Energy packets are scheduled considering all storage and configuration constraints. The objective is to minimize the peak load of a given feeder (i.e., flatten out the feeder's load profile). The physical limits of the devices and the characteristics of the configurations are described in the constraints. The results of these optimizations will provide a deterministic schedule for energy packet delivery since the load forecast and local renewable generation forecast data are used.

Specifically, following are the formulations of the optimization problems. Nomenclature is given in Table I.

TABLE I

Nomenclature

| Constants | Description | Unit |
| --- | --- | --- |
| $\tau$ | Time step duration | hour |
| h | Time step index | — |
| i | Node index | — |
| x | ESS index $\in \{1, 2\}$ | — |
| H | Time horizon | — |
| $\overline{S}^{i,x}$ | Energy capacity of ESS-x at i | kWh |
| $\overline{P}^{i,x}$ | ESS's power rating of ESS-x at i | kW |
| $\eta_s$ | ESS's self-discharge efficiency $\in \{0, 1\}$ | — |
| $\eta_c$ | ESS's round-trip efficiency $\in \{0, 1\}$ | — |
| $P_l^{i,h}$ | Load forecast at i during h | kW |
| $P_{pv}^{i,h}$ | PV forecast at i during h | kW |

| Variables | Description | Unit |
| --- | --- | --- |
| $P_{max}$ | Peak load of the feeder over time horizon H | kW |
| $P_g^{i,h}$ | Grid power at i during h | kW |
| $_cP^{i,h,x}$ | Charge power of ESS-x at i during h | kW |
| $_dP^{i,h,x}$ | Discharge power of ESS-x at i during h | kW |
| $_c\alpha^{i,h,x}$ | Binary charge status of ESS-x at i during h | — |
| $_d\alpha^{i,h,x}$ | Binary discharge status of ESS-x at i during h | — |
| $S^{i,h,x}$ | The state of energy of ESS-x at i during h | kWh |

Formulation
Objective Function $$\text{minimize}: P_{max} = \max_h \left\{ \sum_i P_g^{i,h} \right\} \quad (1)$$

Constraints for one-ESS configuration are described below $$S^{i,h} = \eta_s S^{i,h-1} + \tau(\eta_c P_c^{i,h} - P_d^{i,h}), \quad (2)$$

$$0 \leq S^{i,h} \leq \overline{S^i}, \quad (3)$$

$$S^{i,0} = S^{i,H}. \quad (4)$$

$$P_d^{i,h} = P_c^{i,h} + P_g^{i,h} + p_{pv}^{i,h} \geq P_l^{i,h}. \quad (5)$$

$$0 \leq P_c^{i,h} \leq \alpha_c^{i,h} \overline{P}^i. \quad (5)$$

$$0 \leq P_d^{i,h} \leq \alpha_d^{i,h} \overline{P}^i, \quad (7)$$

$$\alpha_c^{i,h} = \alpha_d^{i,h} \leq 1, \quad (8)$$

$$\Sigma_i P_g^{i,h} \leq P_{max}, \forall h. \quad (9)$$

Constraints (2), (3) and (4) calculate and make sure the SOEs of ESSs are within their energy capacity limits and the initial SOE is equal to the final SOE.

Constraint (5) is to make sure there is enough power from the grid, PV and ESS to supply the load.

Constraints (6) and (7) describe the power limit of the ESS at node i.

Constraint (8) makes sure the ESS at node do not simultaneously charge and discharge during time step h.

$$P_{max} = \max_h \left\{ \sum_i P_g^{i,h} \right\}$$

Constraint (9) linearizes in the objective function.
Constraints for two-ESS configuration are described below $$S^{i,h,x} = \eta_s S^{i,h-1,x} + \tau(\eta_c P_c^{i,h,x} - P_d^{i,h,x}), \quad (10)$$

$$0 \leq S^{i,h,x} \leq \overline{S^{i,x}}, \quad (11)$$

$$S^{i,0,x} = S^{i,H,x}, \quad (12)$$

$$\Sigma_{x \in \{1,2\}} \{P_d^{i,h,x}\} \geq P_l^{i,h}, \quad (13)$$

$$\Sigma_{x \in \{1,2\}} \{P_c^{i,h,x}\} \leq P_g^{i,h} + P_{pv}^{i,h}, \quad (14)$$

$$0 \leq P_c^{i,h,x} \leq \alpha_c^{i,h,x} \overline{P}^i, \quad (15)$$

$$0 \leq P_d^{i,h,x} \leq \alpha_d^{i,h,x} \overline{P}^i, \quad (16)$$

$$\alpha_c^{i,h,1} = \alpha_d^{i,h,2}, \quad (17)$$

$$\alpha_d^{i,h,1} = \alpha_c^{i,h,2}, \quad (18)$$

$$\alpha_c^{i,h,x} = \alpha_d^{i,h,x} \leq 1, \quad (20)$$

$$\Sigma_i P_g^{i,h} \leq P_{max}, \forall h. \quad (20)$$

Constraints (10), (11) and (12) calculate and make sure the SOEs of ESSs are in within their energy capacity limits and the initial SOE is equal to the final SOE.

In the two-battery configuration, the load and the grid are fully decoupled using ESSs. Therefore, constraints (13) and (14) make sure power are balanced on both the load side and the grid side.

Constraints (15) and (16) describe the power limit of the ESSs at node F.

Constraint (17), (18) and (19) make sure the two ESSs at node i alternatively charge from the grid and discharge to the load during time step k.

$$P_{max} = \max_h \left\{ \sum_i P_g^{i,h} \right\}$$

Constraint (20) linearizes in the objective function.
Flexible Delivery Scheduling If the deterministic schedule is implemented exactly, there will be mismatch between the total energy delivered to the loads' energy storage systems (ESSs) and the actual load consumption due to forecast errors. Even though this mismatch will not impact the loads right away, it will affect the state of charge balancing of loads' ESSs and therefore impact the load eventually. Therefore, flexible delivery scheduling is needed to make up for the mismatch amount due to forecast error. Specifically, at the end of each day, adjustments will be made as follows:

If the SOC of an ESS is less than its initial SOC, an additional energy packet will be delivered to that ESS to bring it back to the initial SOC If the SOC of an ESS is greater than its initial SOC, the ESS will need to return the difference to the grid and/or to the other BESS at the same location.

Stochastic Delivery Scheduling

In flexible delivery scheduling, forecast errors or uncertainties are realized after the fact (e.g., at the end of the day). Doing it this way can only be effective if forecast errors are small. In other words, if the forecast errors are large, the following issues could occur:

ESSs do not have enough energy to carry the loads until the end of the day.

The adjustments can be significant that could create a major peak or dip in the feeder's load profile.

Therefore, stochastic delivery scheduling is needed to include forecast errors within the scheduling process. Specifically, this scheduling process includes the following steps:

Characterizing forecast errors: calculate the cumulative distribution functions (CDFs) for renewable energy and load forecast errors of each time step.

Introduce random variables into the optimization to represent forecast errors:

$$x^{i,h} = x_{forecast}^{i,h} + x_{error}^{i,h},$$

where $x^{i,h}$ is a variable that represents actual load or renewable energy at node i and time h; $x_{forecast}^{i,h}$ represents the forecast value of $x^{i,h}$; $x_{error}^{i,h}$ is the random variable that represents the error of the forecast.

Perform stochastic optimization:
The discharge schedule of ESSs must guarantee that the loads are met at a predefined probability.
The charge schedule of ESSs (i.e., packet delivery schedule) must guarantee that there's sufficient energy to charge at a predefined probability.

Example. Multiple Diverse Loads

Figure 4:
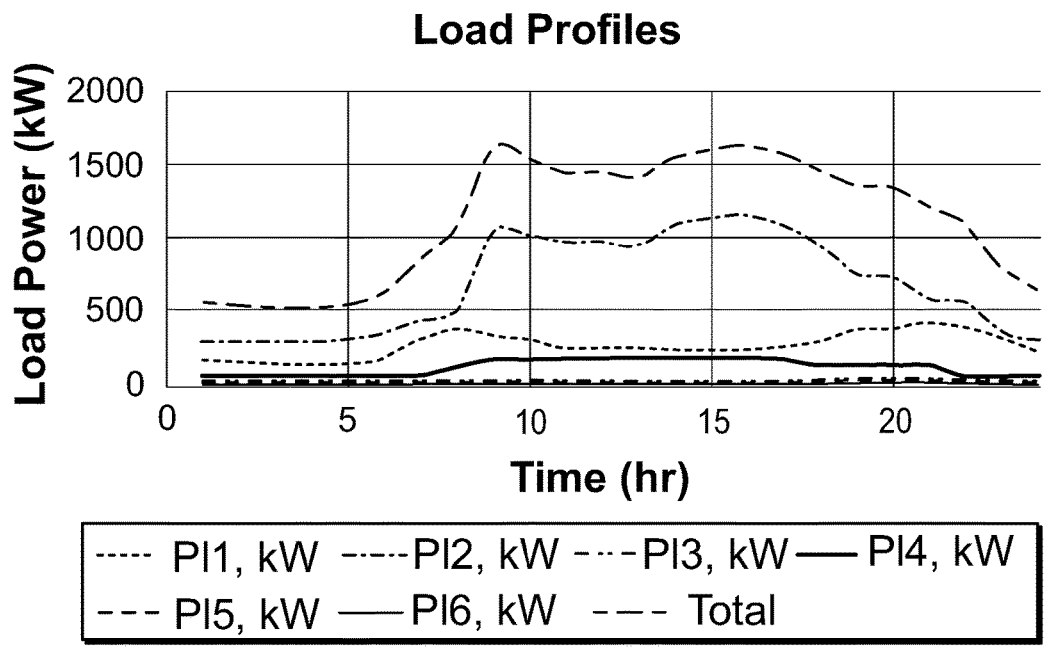
FIG. 4 shows daily profiles of the loads in large feeder example according to an embodiment of the disclosure.

In this example, a hypothetical utility feeder that powers one large hotel, one primary school, one large office building, 20 large houses, 20 medium houses and 20 small houses is used. The load consumptions are simulated based on TMY (Typical Meteorological Year) weather data of New Mexico. Daily load profiles are given in FIG. 4. Since the residential loads are relatively small, they are clustered together in three groups including large house load, medium house load and small house load. A one-ESS configuration or two-ESS configuration is associated with each load or load cluster.

The ESSs are sized so that they can power the associated loads the whole day. In this example, we assume the operator wants to minimize the peak load of the feeder.

A. One-ESS Configuration Deterministic Scheduling Results

Figure 5:
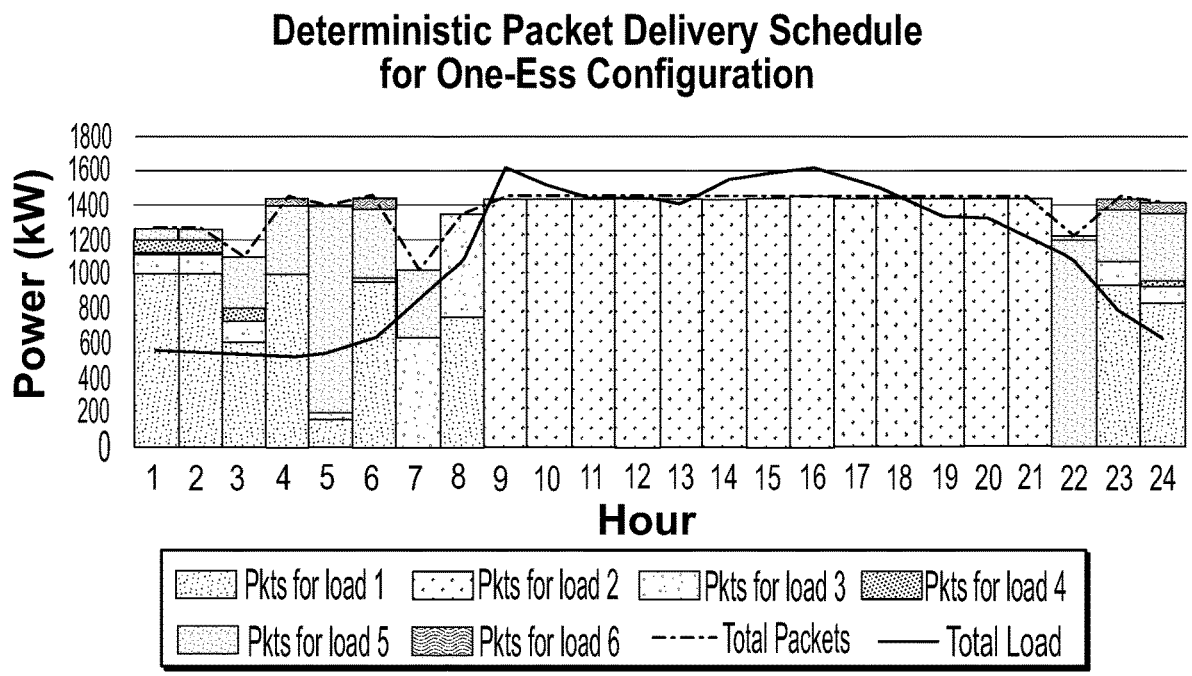
FIG. 5 shows a deterministic packet delivery schedule for one-ESS configuration according to an embodiment of the present disclosure.
Figure 6:
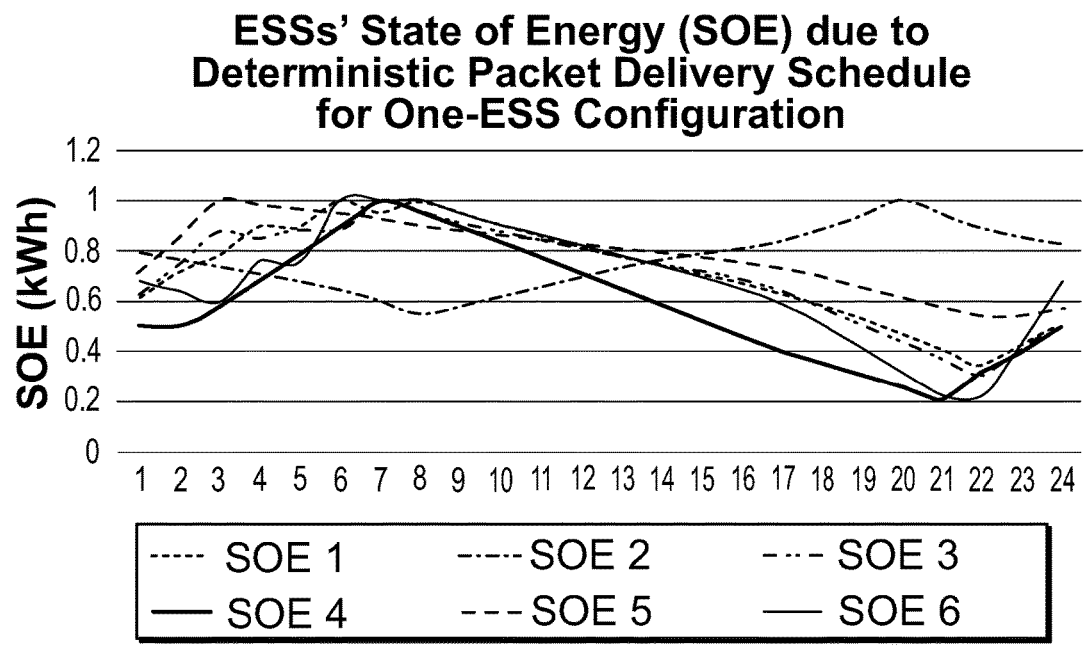
FIG. 6 shows ESSs' State of Energy (SOE) due to a deterministic packet delivery schedule for one-ESS Configuration according to an embodiment of the present disclosure.

Using one-ESS configuration, the operator can schedule the delivery of energy packets to the customers' ESSs to achieve her/his objective (e.g., minimize the peak load of the feeder as we assume in this case study). As a result of the operator's optimization problem, energy packets are specified in FIG. 5. As can be seen from the schedule, different electricity packets can be scheduled at different times in order to minimize the total peak load of the feeder. While the packets for each customer are discrete, the total load seen from the feeder is continuous and specified by the sum of all energy packets. Given the load profiles and the packet delivery schedule, the state of charge (SOC) of the customers' ESSs are specified in FIG. 6. It is shown that the SOCs are always above 20%. That means in the worst-case scenario when a grid outage occurs between 21:00 and 23:00, all of the ESSs can maintain their full loads for more than 4.8 hours. In FIG. 6, SOE i (1-6) is the state of energy of the ESS at load i (1-6).

B. Two-ESS Configuration Deterministic Scheduling Results

Figure 7:
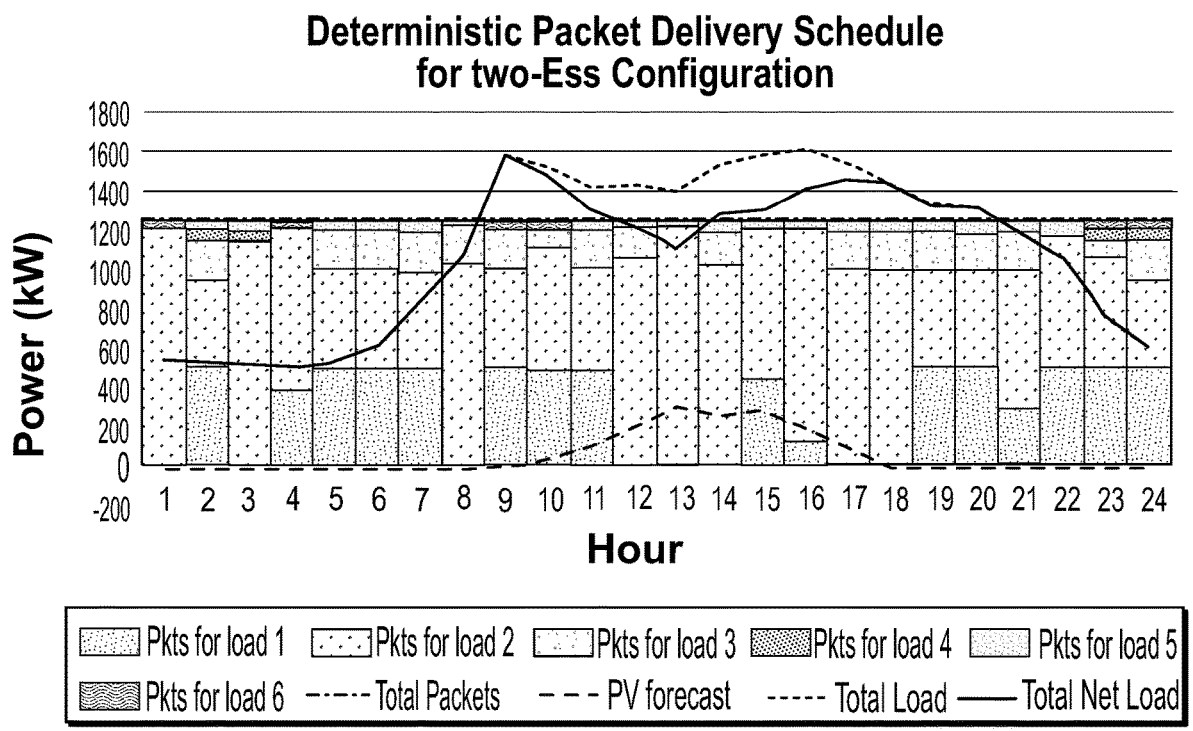
FIG. 7 shows a deterministic packet delivery schedule for two-ESS configuration according to an embodiment of the present disclosure.
Figure 8:
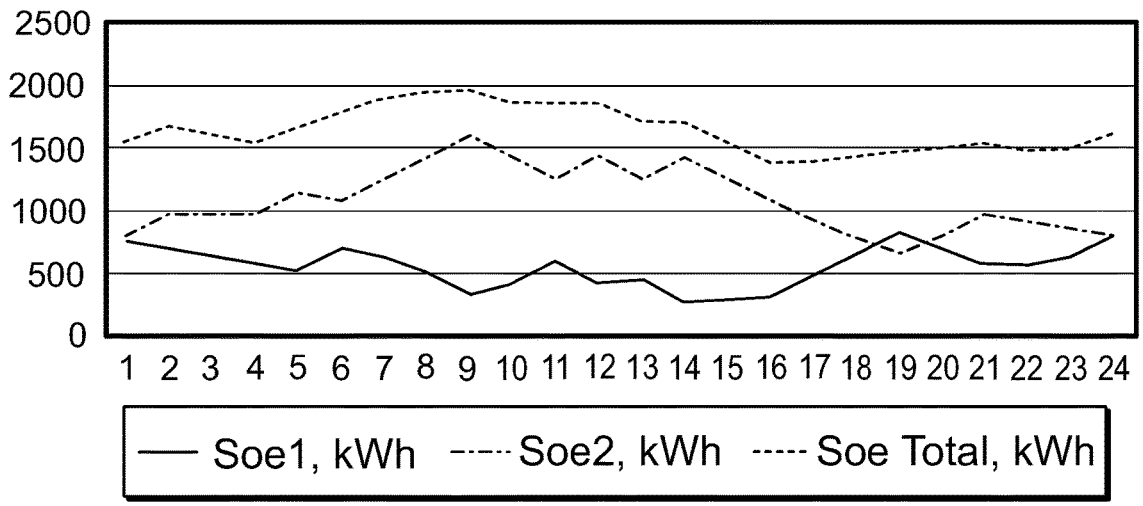
FIG. 8 shows ESSs' SOE at a load (a primary school) due to a deterministic packet delivery schedule for two-ESS Configuration according to an embodiment of the present disclosure.

Different from one-ESS configuration, two-ESS configuration allows much more flexibility in scheduling the packet delivery to the customers. The two batteries can alternatively charge and discharge making the load profile look flat to the grid while maintaining the real load. As a result of the operator's optimization problem, energy packets are shown in FIG. 7. In FIG. 8, Soe1 is the state of energy of the first ESS at primary school, Soe2 is the state of energy of the second ESS at primary school and Soe Total is the total state of energy of both ESSs. As can be seen in FIG. 8, the total state of energy (SOE) of the two batteries at any site is high at any time. For example, the total SOE of the batteries at the primary school is always above 1400 kWh which is enough to power the load for 12 hours if outages occur see FIG. 8.

C. Two-ESS Configuration Flexible Scheduling Results

Figure 9:
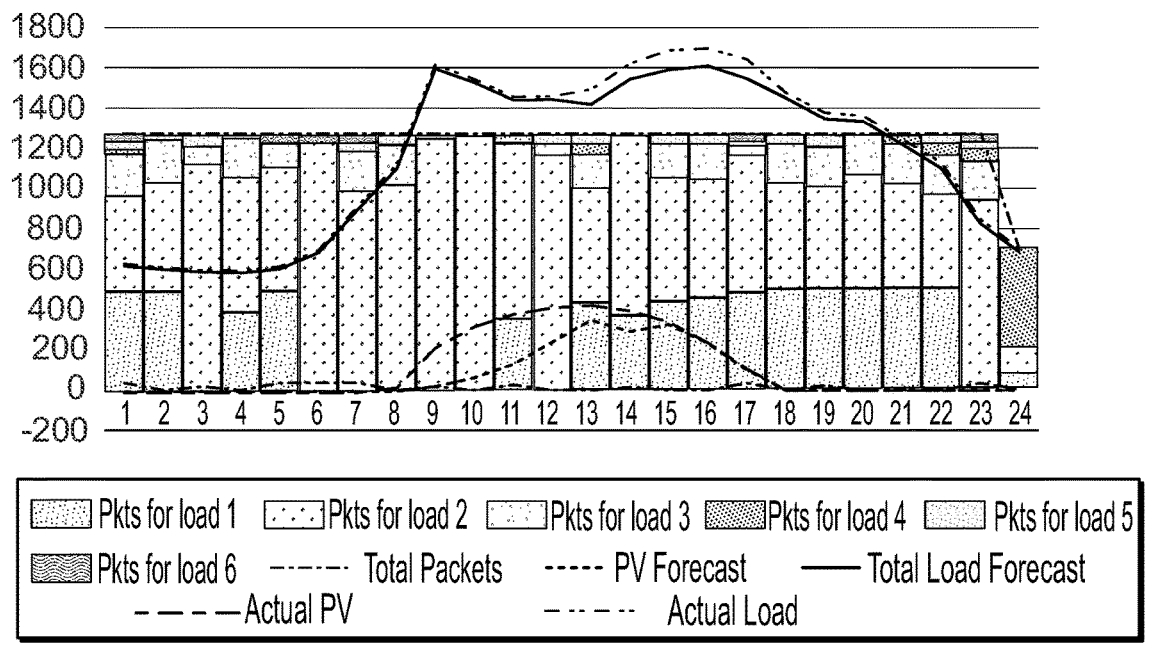
FIG. 9 shows flexible packet delivery schedule for two-ESS configuration according to an embodiment of the present disclosure.

A flexible delivery schedule with adjustment period is shown in FIG. 9. As can be seen in FIG. 9, the packets are specified using deterministic scheduling and delivered to the loads' ESSs during the first 23 hours of the day. At hour 24, all ESSs are rebalanced to make sure their state of charges are at 50%.

Figure 10:
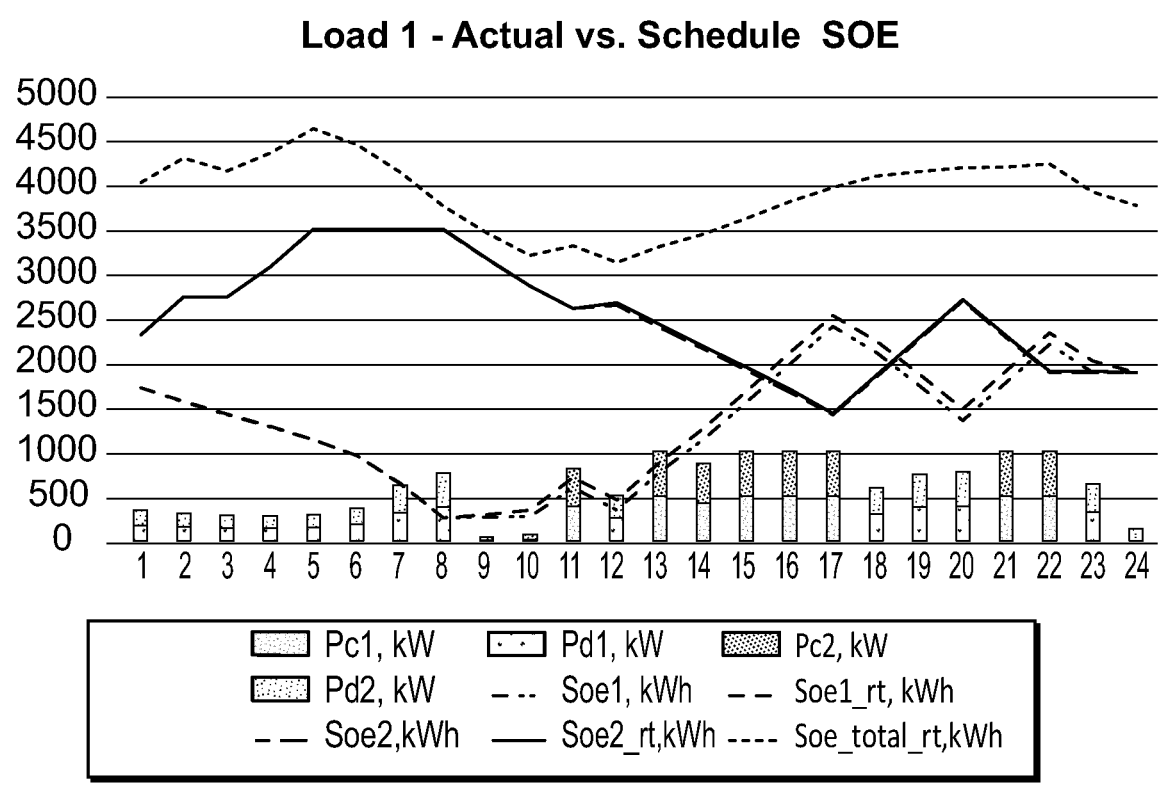
FIG. 10 shows an actual vs scheduled charge and discharge profile of ESSs at load 1 (a large hotel) in the large feeder example according to an embodiment of the present disclosure.

FIG. 10 shows the actual vs scheduled charge/discharge profile and state of energy of each ESS at load 1, which is the one large hotel. In FIG. 10, Pc1 and Pc2 represent charge power to ESS-1 and ESS-2; Pd1 and Pd2 represent discharge power from ESS-1 and ESS-2; Soe1 and Soe2 represent the state of energy of ESS-1 and ESS-2 if load forecast and PV forecast are perfect; Soe1_rt and Soe2_rt represent the actual state of energy of ESS-1 and ESS-2 that different from Soe1 and Soe2 due to imperfect forecasts. As can be seen in FIG. 10, the flexible schedule is able to bring load 1's ESSs back to 50% at the end of the day.

While the invention has been described with reference to a preferred embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for delivering energy to a node in a power system,
wherein the node comprises one or more energy storage systems and a load, the method comprising:
sizing the energy storage systems, including power and energy ratings, at each node based on expected load and local generation;
scheduling delivery of energy packets based on parameters selected from a group comprising grid constraints, generation constraints, energy storage constraints, system operating costs and energy storage degradation;
controlling switches that route scheduled energy to at least one energy storage system of the energy storage systems at the correct time to enable packetized delivery of energy; and
controlling switches that route unscheduled energy to the energy storage systems at the correct nodes at the correct time to enable packetized delivery of energy.

2. The method of claim 1, wherein each node further comprises a distributed energy resource that provides energy to the one or more energy storage systems.

3. The method of claim 1, further comprising:
controlling other switches that route unscheduled energy to the energy storage systems at the correct nodes at the correct time to enable packetized delivery of energy when the node comprises two or more energy storage systems.

4. The method of claim 1, wherein the one or more energy storage systems comprise a power electronics interface to an energy storage technology selected from the group consisting of electrical, electrochemical, mechanical, or thermal energy storage.

5. The method of claim 4, wherein the energy storage technology is an electrochemical storage technology.

6. The method of claim 5, wherein the electrochemical storage technology is a battery.

7. The method of claim 1, further comprising:
communicating to the grid operator (e.g., utility, load serving entity, a specific generator, etc.) a request or notice to deliver the packet amount of energy at the scheduled time.

8. The method of claim 1, wherein the parameters further comprise minimizing the daily peak of a load or a load aggregation, minimizing electricity bills for the customers, and maximizing revenue for the load aggregations from participating electricity market.

9. An energy delivery system, comprising:
one or more energy storage systems; and
a controller that provides information to a grid operator and receives instructions to provide a packet of energy to one or more of the energy storage systems, the instructions comprising an amount of energy and a delivery schedule for the amount of energy.

10. The system of claim 9, further comprising:
one or more electrical loads; and
one or more switches that the controller uses to electrically connect or disconnect the one or more energy storage systems to which the utility grid has been instructed to provide a packet of energy from the one or more electrical loads.

* * * * *